March 19, 1940.  W. R. MILLICAN ET AL  2,194,198
BRAKE OPERATING MECHANISM
Filed April 9, 1937
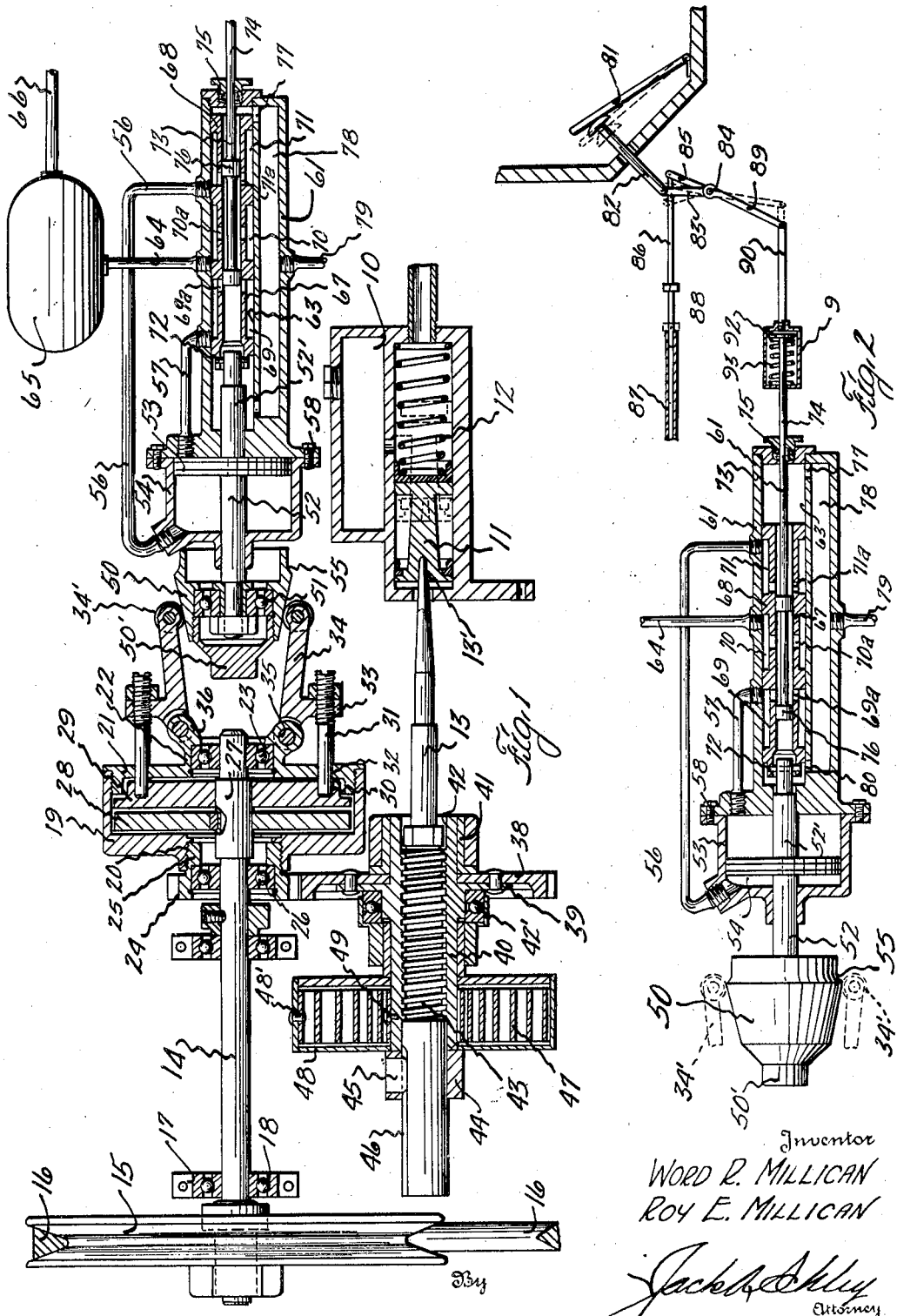
Inventor
WORD R. MILLICAN
ROY E. MILLICAN
By Jack A. Shley
Attorney Patented Mar. 19, 1940

2,194,198

UNITED STATES PATENT OFFICE 2,194,198

BRAKE OPERATING MECHANISM

Word R. Millican and Roy E. Millican, Mesquite, Tex.

Application April 9, 1937, Serial No. 135,897

10 Claims. (Cl. 192—3)

This invention relates to new and useful improvements in brake operating mechanism.

One object of the invention is to provide improved means for operating the brake of a vehicle, whereby the operator may control the application of the brake with minimum effort and inconvenience to him.

An important object of the invention is to provide an improved brake operating mechanism wherein the power of the engine of a vehicle is utilized to apply the brake of said vehicle, whereby no effort on the part of the operator is required.

Another object of the invention is to provide an improved mechanism for operating the brake of a motor vehicle which is constructed so that the brake is applied by the power of its motor of the vehicle, with means for controlling the application of such power to the brake by the usual foot accelerator of the vehicle, whereby the brake pedal, together with its inconvenience, is entirely eliminated.

Still another object of the invention is to provide an improved brake operating mechanism having mechanical means for applying the brake and having hydraulic means for controlling the application of power to the brake by the mechanical means, whereby smoothness of operation is had; the hydraulic system being supplied with fluid from the crank case of the vehicle, whereby an auxiliary fluid supply is not necessary.

A still further object of the invention is to provide an improved mechanism of the character described wherein the hydraulic means which controls the mechanical means is operated by the foot accelerator of the motor vehicle; the accelerator being so constructed that its movement includes a braking range and a fuel supply range, the former being at one end of the accelerator movement with the fuel range during the remainder of the movement, whereby it is impossible to apply the brake while fuel is being supplied or vice versa.

Another object of the invention is to provide an improved braking mechanism which is controlled directly in accordance with the position of the accelerator whereby the braking may be positively controlled with the mechanism, exactly as with the usual brake pedal ordinarily provided.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is a longitudinal sectional view of a braking mechanism, constructed in accordance with the invention, and showing the position of the parts with the brake released, and Figure 2 is a similar view of the hydraulic control valve and its connection with the foot accelerator with the brake applied.

In the drawing, the numeral 10 designates the master cylinder of a hydraulic braking system, such as is in common use on motor vehicles. The cylinder has a piston 11 movable therein and a coiled spring 12 exerts its pressure to hold the piston toward one end of the cylinder (Figure 1) and when in such position, the brake of the vehicle is released. Movement of the piston to the position shown in dotted lines in Figure 1 forces hydraulic brake fluid to the wheels of the vehicle to apply the brake. The above is of the usual construction and forms no part of the present invention and is, therefore, subject to variation, having been described merely for the sake of clarity.

For imparting movement to the brake piston 11 to apply the brake, a movable operating rod or stem 13 has one end engaging a recess 13' in the end of the piston. Manifestly, a movement of the stem or rod 13 inwardly of the cylinder 10 will impart a movement to the brake piston under tension of the spring 12. A movement of the rod in an opposite direction will permit the spring 12 to return the piston to its original position to release the brake of the vehicle.

For actuating the rod or stem 13 from the motor or engine of the vehicle (not shown), a gear assembly is provided. This assembly includes a rotatable driven shaft 14 which has a pulley 15 secured to one end thereof. This pulley is connected by a belt 16 with the drive shaft (not shown) or other moving part of the motor of the vehicle, whereby the shaft 14 is rotated when said motor is operated. The shaft is suitably journaled in bearing collars or brackets 17 which are provided with ball bearings 18 to facilitate rotation of said shaft.

The end of the shaft extends through a rotatable, cylindrical housing 19 through an axial opening 20 in the end wall thereof. The housing has its opposite open end closed by a cap member 21 which is threaded thereinto and the cap is formed with an axial opening which is surrounded by a collar 22. The end of the shaft projects a slight distance from the collar and a suitable ball bearing assembly 23 is interposed between the shaft and collar, whereby the end of the shaft is rotatably supported in this end of the housing.

A drive gear 24 surrounds the shaft adjacent the opening 20 in the end wall of the housing and has a collar 25, preferably made integral with the gear, which is screwed into the opening 26, whereby the gear is affixed to the housing. A suitable bearing assembly 26 is interposed between the gear 24 and shaft 14, whereby rotation of the shaft within the gear is facilitated. Obviously, with the above construction, the shaft 14 may rotate within the housing 19 without imparting rotation thereto.

For effecting a driving connection between the shaft 14 and the housing 19 so as to impart rotation to the drive gear 24, that portion of the shaft within the housing is enlarged as shown at 27. A clutch disk or plate 28 is keyed on this enlarged portion of the shaft whereby said disk rotates with the shaft. To connect this rotating disk with the housing 19, a second clutch plate or disk 29 is mounted to slide on the enlarged portion of the shaft being located adjacent the disk 28. The disk 29 is formed with a plurality of recesses 30 in its outer surface and the inner ends of laterally directed pins 31 are secured in said recesses. Each pin extends outwardly through an opening 32 in the cap 21, being slidable therethrough and has its extreme outer ends threaded into a lug 33 which is formed near the inner end of an arm 34. Each arm is pivoted at 35 to an ear 36 which is formed on the outer end of the collar 22 of the cap 21. By moving the arms 34 inwardly toward each other, the pins 31 will be pulled outwardly from the housing 19, whereby the plate 29 is moved against the cap. When the arms 34 are expanded or moved away from each other, as will be hereinafter explained, the pins 31 are moved inwardly of the housing 19 to slide the plate 29 on the shaft 14, so as to engage said plate with the clutch plate 28 which is keyed on said shaft. When the clutch disks 28 and 29 engage each other, and the shaft 14 is rotating, the frictional engagement therebetween will cause the disk 28 to impart rotation to the disk 29. Since this latter disk has connection with the housing 19 through the pins 31, the housing is rotated therewith. Rotation of the housing will, of course, rotate the drive gear 24.

The gear 24 is in constant mesh with an enlarged gear 38 which is riveted, or otherwise secured to an annular flange 39 formed on an elongate sleeve 40. The sleeve is mounted to rotate in a suitable support 41 which may be fastened on the motor block (not shown) of the vehicle. Suitable ball bearings 42' are disposed in the support adjacent the flange 39 of the sleeve to permit easy rotation thereof when the gear is rotated.

The bore 42 of the sleeve 40 receives the outer end of the operating rod or stem 13 which engages the brake piston 11 of the master cylinder 10. The rod is formed with threads 43 providing a screw which has threaded engagement with the bore. The extreme outer end of the rod extends from the bore of the sleeve through a bearing collar 44 which is mounted in a fixed position on the vehicle motor or frame, or other support. A key 45 in the stationary collar engages a longitudinal keyway or recess 46 in the periphery of the rod 13 and permits a sliding movement of the rod, while preventing rotation thereof.

From the above it will be seen that when the drive gear 24 drives the gear 38, the sleeve 40 is rotated. Due to the threaded engagement between the bore of the sleeve and the threads 43 of the rod 13, said rod will be moved with relation to the sleeve. The rod cannot rotate because of the key 45 and through the screw jack action the rod is moved so as to move the brake piston 11 under compression of the spring 12 to apply the brake. When the brake is completely applied, the clutch plates 28 and 29 will slip, which prevents damage to the mechanism.

The shaft 14, as has been explained, is connected by the belt 16 and pulley 15 with the drive shaft, fan shaft, or other moving part of the motor and therefore, always rotates in only one direction. Thus, when it is desired to release the brake, the control arms 34 are swung inwardly to disengage the clutch plates 28 and 29. This prevents further rotation of the drive gear 24, gear 38 and sleeve 40. However, the rod 13 has been moved within the cylinder 10 by the screw jack action of the sleeve on its threads. To return the rod to its original position and permit the release of the brake of the vehicle, it is necessary that the sleeve 40 be rotated in a reverse direction.

For effecting this reverse rotation of the sleeve 40 when the clutch plates 28 and 29 are separated, a flat spring 47 surrounds the sleeve and is confined in a casing 48 which is secured to the support 41, whereby said casing is stationary with relation to the sleeve. One end of the spring is secured to the casing at 48' while its other end is secured to the sleeve at 49. Therefore, when the sleeve 40 is rotated by the gear 38 to apply the brake, as has been explained, the spring 47 is wound so as to be under tension when the rod 13 has applied the brake. When the clutch plates or disks 28 and 29 are disengaged to disconnect the shaft 14 from the housing 19, gears 24 and 38 and sleeve 40, the spring automatically unwinds and in unwinding, imparts a reverse rotation to the sleeve. This reverse rotation of the sleeve retracts the rod 13 within said sleeve and permits the coiled spring 12 to return the piston 11 to its brake releasing position, as shown in full lines in Figure 1.

Obviously, the force exerted against the piston 11 in applying the vehicle brake is obtained from the motor of said vehicle for the sleeve 40 is rotated through its connection with the shaft 14. Therefore, no energy on the part of the operator need be exerted in applying said brake. The position of the pivoted control arms 34 which are carried by the collar positively controls the position of the clutch plate 29 with relation to the plate 28, whereby said arms control the rotation of the sleeve which results in application of the vehicle brake.

Any suitable means may be employed for spreading and retracting the control arms 34 but it is preferable to employ the structure shown in Figure 1. A conical expanding head 50 is located in axial alinement with the housing 19 and is movable axially with relation thereto. This head is rotatably mounted on ball bearings 51 on the outer end of a piston rod 52 which is slidably supported in a cylinder 54. A piston 53 is secured to the rod within the cylinder and is movable therein, whereby movement may be imparted to the rod. The outer end of the head is closed by a cap member 50'.

The head 50 is substantially conical being gradually reduced toward its outer end. The inner end of the head is formed with an annular recess or curved shoulder 55 on its outer periphery. Since the head is located axially of the housing 19, the outer ends of the control arms 34 are arranged to engage the outer surface thereof. These outer ends of said arms have rollers 34' mounted therein, which rollers facilitate movement of the head with relation to the arms. The arms are at all times engaging the head and manifestly, when the head is moved toward the housing 19 from the position shown in Figure 1, the outer ends of said arms riding the inclined surface of the head, are swung outwardly or expanded which moves the clutch disk or plate 29 into engagement with the plate 28, as hereinbefore stated.

As the head moves further between the arms 34, the plates 28 and 29 are engaged and the housing 19 begins to rotate with the shaft 14. The amount of frictional contact between the clutch plates is determined by the position of the head for manifestly, as the head increases the expansion of the arms, the frictional grip between the plates is increased, which increases the application of the brake in accordance therewith. The arms 34 secured to the housing 19 rotate therewith and their frictional engagement with the head 50 imparts a rotation to said head, which easily revolves on the piston rod 52. This structure eliminates a drag or frictional resistance to the rotation of the housing 19. When the piston 53 is moved, the head 50 is retracted from between the arms 34 and said arms may swing inwardly to disengage the clutch plates 28 and 29 and release the brake.

Any suitable means may be employed for imparting a movement to the piston 53 within the cylinder 54, whereby the head 50 may be moved with relation to the arms 34 to swing the same. However, it is preferable to operate the piston 53 by fluid pressure whereby a smooth and even actuation thereof is effected. For this purpose, a pressure fluid supply line 56 is connected to one end of the cylinder 54, while a second pressure fluid line 57 is connected to the opposite side of said cylinder. Manifestly, the introduction of a pressure fluid through the line 56 will move the piston to the position shown in Figure 1, whereby the head 50 is retracted from between the arms 34 which permits disengagement of the clutch plates 28 and 29 and causes a release of the vehicle brake, as has been explained. An introduction of fluid through the line 57 will of course move the piston 53 in an opposite direction to cause the head 50 to expand said arms, engaging the clutch plates 28 and 29 and causing an application of the brake through the movement of the operating rod 13.

For controlling the admission of pressure fluid to the lines 56 and 57 to control the movement of the piston 53 a control valve assembly is provided. This valve comprises a cylindrical housing 61 which is preferably made integral with the end of the cylinder 54. As clearly shown in Figure 1 the housing 61 may be secured by bolts 58 to the cylinder 54. The piston rod 52 extends completely through the piston 53 and this extended end 52' extends into a longitudinal bore 63 which is formed in the housing 61.

The pressure fluid line 56 leading from the cylinder has its other end connected in the housing 61 so as to communicate with the bore 63, while the other end of the fluid line 57 is similarly connected in said housing. Thus, both lines 56 and 57 have communication with the bore 63 of the housing. A supply line or tube 64 has its lower end leading from the bore 63, being connected at a point between the lines 56 and 57. The other end of the line 64 is connected to a storage chamber 65 which is supplied with fluid under pressure by a pipe 66 which leads from the usual oil pump (not shown) of the motor vehicle. Obviously, the fluid under pressure flows from the supply line 64 into the bore 63 from where it flows to the lines 56 and 57 to operate the piston 53 in a desired direction.

For conducting the fluid to either one or the other of the lines 56 and 57 in order to move the piston 53, a sleeve 67 is mounted to undergo movement within the bore 63 of the housing. The sleeve is open at each end and is formed with a plurality of collars 68 which are preferably integral therewith and which are spaced throughout the length of the sleeve. The collars have a diameter substantially equal to the diameter of the bore so as to have a snug sliding fit within said bore. The provision of the collars spaces the surface of the sleeve from the wall of the bore 63 whereby a trio of annular channels 69, 70 and 71 are formed between the sleeve and bore. The inner end of the sleeve is connected by a radial pin 72 with the extended end 52' of the piston rod 52 so that when the piston 53 and the rod 52' are moved, the sleeve 67 is moved within the bore.

With the brake applied and the piston 53 in the position shown in Figure 2, the end of the annular channel 69 is beneath the line 57, the end of the channel 70 is beneath the supply line 64 and the channel 71 is beneath the line 56. Radial ports 69a are located diametrically opposite each other at one end of the channel 69 and establish communication between the channel and bore of the sleeve. Similar ports 70a are located centrally of the channel 70, while other ports 71a are disposed at one end of the channel 71 and thus, all of the channels communicate with the bore of the sleeve 67. Therefore the fluid from the supply line 64 flows into the central annular channel 70, then into the bore of the sleeve 67, from which it flows to one or the other of the channels 69 or 71 to supply either the line 56 or the line 57.

For controlling the flow of fluid from the central channel 70 to the other channels, a sliding valve member 73 is mounted within the sleeve. This member includes an actuating stem 74 which projects through a stuffing box 75 at the outer end of the bore 63. A pair of circular heads 76 are mounted on the stem in spaced relation and have a sliding fit within the sleeve 67, and the space between the heads is equal to the distance between the ports 69a and 71a. When the brake is applied, the parts are in the position shown in Figure 2, with the inner head 76 of the valve member beyond the ports 69a and the other head positioned between the ports 70a and 71a of the channels 70 and 71 respectively. At this time the pressure fluid from the supply line 64 flows into the central annular channel 70, through the ports 70a and into the bore of the sleeve 67. From the bore, the fluid flows through the ports 69a, channel 69 and into the fluid line 57 which conducts it to the end of the cylinder 54 to hold the piston 53 against the opposite end wall of said cylinder. As the piston 53 was moved due to the action of the pressure fluid through the line 57, it is manifest that the head 50 will have been moved within the operating arms 34 to expand the same and cause the clutch disk 29 to engage the clutch disk 28.

As the piston 53 has moved to the position shown in Figure 2, the fluid from the other side of the piston has drained through the line 56, channel 71 into the interior of the sleeve 67, from where it flows from the open end thereof into the bore 63 of the housing. From the bore, said fluid passes through an opening 77 which communicates with a longitudinal drain passage 78 formed in the housing. A suitable return line 79 is connected to the passage to return the fluid to the source of supply. It is noted that if a leak should occur at this time in the line 57 or in the cylinder 54 and the fluid escaped therefrom, additional fluid is supplied to the line 57 since the communication between the supply line 64 and the line 57 is held open at all times.

When it is desired to release the brake and move the piston 53 to its opposite position or that shown in Figure 1, the valve member 73 is moved within the sleeve to move its inner head away from the piston rod 52'. Movement of the valve member causes the heads 76 to move into the position shown in dotted lines in Figure 2 with the inner head in alinement with the ports 70a although not completely covering the same. The other head has moved to the outer end of the sleeve and therefore, a communication is established between the ports 70a and the ports 71a whereby the pressure fluid may flow from the supply line 64 to the line 56. At the same time, the ports 69a leading from the line 57 are in communication with the bore 63 to the open end of the sleeve 67, thereby permitting fluid to drain from the line 57 into the bore 63 and then through an opening 80 which leads to the drain passage 78. As the pressure fluid is conducted to the cylinder 54 through the line 56, the piston 53 is moved from the position shown in Figure 2 to the position shown in Figure 1. As this occurs, the sleeve 67 is moved outwardly in the bore 63 because of its connection to the pin 72 with the piston rod 52'. This movement of the sleeve causes the parts to assume the position shown in Figure 1, with the ports 69a and 70a completely uncovered and the ports 71a partially covered by the outer head of the valve member. The communication between the line 64 and the line 56 has been maintained and is maintained so long as the vehicle brake is released. Therefore, the pressure is always held on the piston 53 when the brake is released and danger of leaks causing unintended application of the brake is obviated. To apply the brake, the valve member is moved inwardly to again establish communication between the line 64 and the line 57, while the line 56 is permitted to drain, as has been explained.

From the above, it will be seen that the piston 53 may be moved from complete brake releasing position to complete brake applying position by moving the valve member 73 from one extreme position to the other within the bore of the sleeve. There are many instances where the brake is only partially applied and therefore, the valve member and sleeve 67 are so arranged that they may be stopped in any of their intermediate positions, and the amount of pressure applied to the brake is dependent upon the position of the parts within the bore. Assuming the parts to be in brake releasing position as shown in Figure 1, and supposing that it is only necessary to apply the brake partially, then the member 73 is moved only a part of the distance through the bore of the sleeve so that said valve member travels forwardly (to the left Figure 1) within the sleeve, whereby the outer head 76 thereof uncovers a portion of the port 69a and establishes communication between the supply line 64 and line 57. For example, it will be assumed a one eighth inch area of the port 69a is uncovered which restricts the flow of fluid through the line 57. Since the heads 76 are spaced the same distance apart on the member as the ports 69a and 71a in the sleeve, uncovering of one eighth inch of the port 69a to permit flow into the line 57 causes a similar uncovering of the port 71a to permit an exhaust of the fluid from the piston cylinder through the line 56.

As the fluid flows into the line 57 the piston 53 is moved which imparts a movement to the sleeve 67. This movement of the piston and sleeve continues until the ports 69a and 71a move into alinement with the heads 76, which cuts off the flow of fluid through the lines 56 and 57 and halts the piston in its intermediate position, where said piston remains until the valve member 73 is again moved. Therefore, it is evident that any amount of pressure may be applied to the brake piston 53 by properly manipulating the valve member 73. The piston 53 may be halted in any intermediate position between its limits of movement and therefore, the same control of the braking may be had as with the usual brake pedal.

Any suitable means may be employed to actuate the valve member 73, but it is preferable that it be controlled by the usual foot accelerator pedal 81 of the vehicle, in which case the usual brake pedal may be eliminated. As shown in Figure 2, the underside of the accelerator pedal contacts the upper end of a rod 82 and the lower end of this rod is pivoted to an arm 83, which arm is secured on a rotatable shaft 84. One end of the shaft has an upwardly extending arm 85 fastened thereon and this arm is pivoted to one end of a rod 86. The other end of the rod 86 telescopes a sleeve 87 which is connected with the fuel throttle on the motor (not shown). A nut 88 is secured on the rod 86 at a predetermined point and is arranged to engage the end of the sleeve 87 to impart movement thereto. Obviously when the nut is in the position shown in dotted lines in Figure 2 and spaced from the end of the sleeve it may undergo a limited movement with relation to the sleeve.

The other end of the rotatable shaft 84 has a depending lever 89 secured thereto and the lower end of the lever is pivoted to the outer end of an operating rod 90 which has its other end secured to a housing 91. The outer end of the stem 74 of the valve member extends into the housing and has a collar 92 thereon. A coiled spring 93 is interposed between the collar and the end wall of the housing and when there is no resistance to the movement of the stem 74, the spring connects the stem and the operating rod 90 to cause them to move as a unit however, the stem and rod may move with relation to each other under tension of said spring.

With the brake released, the arm 85 and lever 89 are in the position shown in dotted lines in Figure 2 with the nut 88 spaced from the end of the sleeve 87. As the pedal 81 is depressed, the shaft 84 is rotated in a counter-clockwise direction swinging the lever 89 which moves the valve member 73 through the rod 90 and stem 74. While the member is being moved the rod 86 is telescoping the sleeve but no movement is imparted to said sleeve because the nut 88 is not in engagement with the end thereof. Of course, as soon as said nut engages the sleeve 87, the fuel throttle is actuated and by this time the valve member 73 has completed its movement, as has been explained. Continued rotation of the shaft 84 due to increase of fuel swings the lever 89 and moves the rod 90. This continued movement of the rod does not move the stem as the motion of the rod is taken up by the spring 93 within the housing 91, thereby permitting movement of the rod 90 relative of the stem 74 after the member has moved its limit.

With such arrangement, the pedal 81 has a braking range and a fuel supply range and it is impossible to apply the brake while increasing the fuel supply. The movement of the pedal through the braking range is relatively small and no effort or exertion on the part of the operator is necessary. The usual brake pedal is entirely eliminated and the starting and stopping of the vehicle is consolidated in one control. Since the brake is automatically applied when the accelerator pedal is released, the danger of the operator leaving the vehicle without setting the brake is obviated.

Attention is directed to the annular shoulder 55 which is formed on the head or cone 50 at the inner end of said cone. It is obvious that the shoulder is of less diameter than the end of the inclined surface of said cone and therefore, when the rollers 34' of the arms 34 rest on the shoulder they are not expanded as far as if they were engaging the extremity of the inclined surface of the cone. Thus, the brake is not completely applied when the rollers are on the shoulder but is only partially applied. The purpose of this shoulder is to prevent a complete application of the brake in the event that the accelerator pedal 81 should be accidentally released while operating the vehicle. In the event that this should occur, the piston 53 would immediately move to the position shown in Figure 2 and the head 50 would be moved within the arms 34 so that the rollers 34' ride off of the inclined surface of the head onto the shoulder 55. Therefore, the accidental release of the pedal 81 would only partially apply the brake whereby the vehicle would come to a gradual stop instead of to a sudden stop, as would be the case if the rollers only moved to the largest diameter of the cone surface.

What we claim and desire to secure by Letters Patent is:

1. A brake operating mechanism for a motor vehicle including, a member for actuating the operating means of the vehicle brake, means for connecting said member to the drive mechanism of the vehicle, whereby the force necessary to actuate the vehicle brake is derived from the motor thereof, and fluid pressure means for controlling the drive connection between said member and the motor, whereby the application of the brake is controlled.

2. A brake operating mechanism for a motor vehicle including, a member for actuating the operating means of the vehicle brake, means for connecting said member to the drive mechanism of the vehicle, whereby the force necessary to actuate the vehicle brake is derived from the motor thereof, fluid pressure means for controlling the drive connection between said member and the motor, whereby the application of the brake is controlled, and a manually controlled valve assembly for effecting the operation of the fluid pressure means.

3. A brake operating mechanism for a motor vehicle including, a member for actuating the operating means of the vehicle brake, means for connecting said member to the drive mechanism of the vehicle, whereby the force necessary to actuate the vehicle brake is derived from the motor thereof, fluid pressure means for controlling the drive connection between said member and the motor, whereby the application of the brake is controlled, and a valve assembly for controlling the operation of the fluid pressure means and actuated by the throttle control of the vehicle.

4. A brake operating mechanism for a motor vehicle including, a movable member for actuating the operating means of the vehicle brake, a gear assembly driven by the motor of the vehicle and connected with said member for moving the member in one direction to apply the brake of the vehicle, fluid pressure operated means for controlling the connection and disconnection of the assembly with the member, and means independent of the gear assembly for moving said member in an opposite direction to permit release of the brake.

5. A brake operating mechanism for a motor vehicle including, a movable member for actuating the operating means of the vehicle brake, a gear assembly driven by the motor of the vehicle and connected with said member for moving the member in one direction to apply the brake of the vehicle, fluid pressure operated means for controlling the connection and disconnection of the assembly with the member, means for controlling the actuation of the pressure operated means by the fuel control lever of the motor of said vehicle, and means independent of the gear assembly for moving said member in an opposite direction to permit release of the brake.

6. A brake operating mechanism for a motor vehicle including, an actuator for actuating the brake operating means of the vehicle, a drive shaft connected with the drive mechanism of the vehicle and rotated thereby, a gear assembly for connecting the drive shaft to the actuator to move the latter in a direction to apply the brake, a clutch between the assembly and drive shaft for controlling the connection therebetween to control the application of the vehicle brake, and means for controlling the actuation of the clutch by movement of the fuel control of the vehicle.

7. A brake operating mechanism for a motor vehicle including, an actuator for actuating the brake operating means of the vehicle, a drive shaft connected with the drive mechanism of the vehicle and rotated thereby, a gear assembly for connecting the drive shaft to the actuator to move the latter in a direction to apply the brake, a clutch between the assembly and drive shaft for controlling the connection therebetween to control the application of the vehicle brake, and pressure fluid operated means for operating the clutch.

8. A brake operating mechanism for a motor vehicle including, an actuator for actuating the brake operating means of the vehicle, a drive shaft connected with the drive mechanism of the vehicle and rotated thereby, a gear assembly for connecting the drive shaft to the actuator to move the latter in a direction to apply the brake, a clutch between the assembly and drive shaft for controlling the connection therebetween to control the application of the vehicle brake, and pressure fluid operated means for operating the clutch, said last named means being controlled in its operation by the fuel control of the vehicle.

9. A brake operating mechanism for a motor vehicle including, an actuator for actuating the brake operating means of the vehicle, a drive shaft connected with the drive mechanism of the vehicle and rotated thereby, a gear assembly for connecting the drive shaft to the actuator to move the latter in a direction to apply the brake, a clutch between the assembly and drive shaft for controlling the connection therebetween to control the application of the vehicle brake, pressure fluid operated means for operating the clutch and a valve assembly for controlling the supply of fluid to the fluid pressure operated means, whereby the application of the vehicle brake is controlled by said valve assembly.

10. A brake operating mechanism for a motor vehicle including, an actuator for actuating the brake operating means of the vehicle, a drive shaft connected with the drive mechanism of the vehicle and rotated thereby, a gear assembly for connecting the drive shaft to the actuator to move the latter in a direction to apply the brake, a clutch between the assembly and drive shaft for controlling the connection therebetween to control the application of the vehicle brake, pressure fluid operated means for operating the clutch, a valve assembly for controlling the supply of fluid to the fluid pressure operated means, whereby the application of the vehicle brake is controlled by said valve assembly, and means for connecting the valve assembly directly to the foot accelerator of the vehicle whereby the application of the brake of the vehicle is controlled by said accelerator.

WORD R. MILLICAN.
ROY E. MILLICAN.